US012683088B2

(12) United States Patent　　　(10) Patent No.: US 12,683,088 B2

Jin et al.　　　(45) Date of Patent:　　Jul. 14, 2026

(54) SOLID ELECTROLYTIC CAPACITOR AND MANUFACTURING METHOD

(71) Applicant: Nippon Chemi-Con Corporation, Tokyo (JP)

(72) Inventors: Zhuguang Jin, Tokyo (JP); Takashi Miura, Tokyo (JP); Yoshiki Kawai, Tokyo (JP); Katsumi Mogaki, Tokyo (JP); Kenji Machida, Tokyo (JP); Kenta Sato, Tokyo (JP); Ippei Nakamura, Tokyo (JP)

(73) Assignee: Nippon Chemi-Con Corporation, Tokyo (JP)

( * ) Notice: Subject to any disclaimer, the term of this patent is extended or adjusted under 35 U.S.C. 154(b) by 0 days.

(21) Appl. No.: 18/694,490

(22) PCT Filed: Sep. 28, 2022

(86) PCT No.: PCT/JP2022/036245

§ 371 (c)(1),
(2) Date: Mar. 22, 2024

(87) PCT Pub. No.: WO2023/054504

PCT Pub. Date: Apr. 6, 2023

(65) Prior Publication Data

US 2025/0046525 A1　　Feb. 6, 2025

(30) Foreign Application Priority Data

Sep. 30, 2021　(JP) .................................. 2021-161152

(51) Int. Cl.
H01G 9/035　　(2006.01)
H01G 9/00　　(2006.01)
(Continued)

(52) U.S. Cl.
CPC ........... H01G 9/035 (2013.01); H01G 9/0029 (2013.01); H01G 9/028 (2013.01); H01G 9/0425 (2013.01); H01G 9/145 (2013.01); H01G 9/15 (2013.01)

(58) Field of Classification Search
CPC ........ H01G 9/15; H01G 9/145; H01G 9/0425; H01G 9/0029; H01G 9/028; H01G 9/035
See application file for complete search history.

(56) References Cited

U.S. PATENT DOCUMENTS 5,338,472 A * 8/1994 Yokoyama ............. H01G 9/022
252/62.2
2008/0002334 A1 1/2008 Kakuma et al.
(Continued)

FOREIGN PATENT DOCUMENTS

JP　　2000-114108 A　　4/2000
JP　　2005039245 A *　2/2005
(Continued)

OTHER PUBLICATIONS

European Search Report for Corresponding Application No. 22876370. 2, mailed Jan. 24, 2025, 10 pgs.
(Continued)

*Primary Examiner* — David M Sinclair
(74) *Attorney, Agent, or Firm* — Dicke, Billig & Czaja, PLLC

(57) ABSTRACT

An electrolytic capacitor with low ESR even in the high frequency range, and the manufacturing method thereof are provided. The solid electrolytic capacitor includes anode foil, a cathode body, and an electrolyte layer. The anode foil id formed of valve action metal, and dielectric oxide film is formed on a surface thereof. The cathode body includes cathode foil formed of valve action metal and a conductive layer formed a surface of the cathode foil. The electrolyte layer intervenes between the anode foil and the cathode foil, (Continued)

and includes electrolytic solution and conductive polymers. The electrolytic solution includes phosphoric acid compound having alkyl groups with the carbon number of 1 to 10.

18 Claims, 2 Drawing Sheets

(51) Int. Cl.
    *H01G 9/028*         (2006.01)
    *H01G 9/042*         (2006.01)
    *H01G 9/145*         (2006.01)
    *H01G 9/15*          (2006.01)

(56)          References Cited

U.S. PATENT DOCUMENTS

| | | |
|---|---|---|
| 2018/0047511 A1 | 2/2018 | Tsuda |
| 2023/0017930 A1 | 1/2023 | Koseki et al. |

FOREIGN PATENT DOCUMENTS

| | | | |
|---|---|---|---|
| JP | 2008-10657 A | 1/2008 | |
| JP | 2017-69537 A | 4/2017 | |
| WO | 2016/174806 A1 | 11/2016 | |
| WO | WO-2020018216 A1 * | 1/2020 | ............ H01G 9/151 |
| WO | 2021/125182 A1 | 6/2021 | |

OTHER PUBLICATIONS

International Search Report of the International Searching Authority for Application No. PCT/JP2022/036245 mailed Nov. 8, 2022 (2 pages).
Office Action for Corresponding Korean Application No. 10-2024-7007987, mailed Feb. 13, 2026, 10 Pgs.
Office Action for Corresponding Taiwan Application No. 111136954, mailed Jan. 8, 2026, 12 Pgs.

\* cited by examiner

SOLID ELECTROLYTIC CAPACITOR AND MANUFACTURING METHOD

CROSS-REFERENCE TO RELATED APPLICATIONS

This Utility Patent Application is a U.S. National Stage filing under 35 U.S.C. § 371 of PCT/JP2022/036245, filed Sep. 28, 2022, which claims benefit to JP2021-161152, filed Sep. 30, 2021, which are each incorporated herein by reference in their entireties.

FIELD OF INVENTION

The present disclosure relates to a solid electrolytic capacitor in which an electrolyte layer includes electrolytic solution and conductive polymers the electrode body, and a manufacturing method thereof.

BACKGROUND

Electrolytic capacitors include valve action metal, such as tantalum or aluminum, as anode foil and cathode foil. A surface of the anode foil is enlarged by making the valve action metal into a sintered body or a shape such as etching foil, and the enlarged surface has a dielectric oxide film layer thereon. The electrolytic capacitor can be regarded as a series capacitor in which capacity is obtained at the anode side and the cathode side. Therefore, cathode-side capacity is very important to efficiently utilize the anode-side capacity.

To efficiently utilize the anode-side capacity, a surface of the cathode foil also enlarged by etching. However, there is a limit to the surface enlargement of the cathode foil from the viewpoint of the thickness of the cathode foil. Accordingly, an electrolytic capacitor in which film of metal nitrides, such as titanium nitride, is formed on the cathode foil has been proposed. Under a nitrogen gas environment, titanium is evaporated by vacuum arc deposition, which is a type of an ion plating method, and titanium nitride is deposited on the surface of the cathode foil. Since the metal nitrides are inert, it is difficult for natural oxide film to form on the metal nitrides, and theoretically, the cathode-side capacity asymptotes to infinity. Furthermore, fine unevenness is formed on the deposited film such that the surface area of the cathode is enlarged.

Electrolytic solution intervenes between the anode foil and the cathode foil. The electrolytic solution closely contacts with the uneven surface of the anode foil and acts as a true cathode. For example, the electrolytic solution contains ethylene glycol or γ-butyrolactone as a solvent, and contains carboxylic acid such as 1,6-decanedicarboxylic acid, 1,7-octanedicarboxylic acid, azelaic acid or salt thereof as a solute. Evaporation and volatilization where the electrolytic solution is released outside the electrolytic capacitor over time may occur. Therefore, the capacitance of the electrolytic capacitor decreases over time toward dry-up and the tangent (tan 5) of the loss angle increases over time, and finally, the electrolytic capacitor ends its lifetime.

Accordingly, electrolytic capacitors in which conductive polymers are intervened between the anode foil and the cathode foil instead of the electrolytic solution is widely used. The conductive polymer is derived from monomers having n-conjugated double bonds and is doped by exterior dopant molecules. For example, the conductive polymer may be poly(3,4-ethylenedioxythiophene) (PEDOT) The dopant may be polystyrene sulfonic acid.

However, the electrolytic capacitors with solid electrolytes are less effective in repairing defects in the dielectric oxide film than the electrolytic capacitors with electrolytic solution. Therefore, so-called hybrid-type electrolytic capacitors in which a solid electrolyte is intervened between the anode foil and the cathode foil and a capacitor element is impregnated with electrolytic solution is getting attention.

PRIOR ART DOCUMENT

Patent Document

Patent Document 1: JP2000-114108A
Patent Document 2: JP2008-10657A

SUMMARY OF INVENTION

Problems to be Solved by Invention

Capacitors with large capacity, small size and ESR (Equivalent Series Resistance) are demanded along with the digitization of electronic equipment. The solid electrolytic capacitor has larger capacity in comparison with film capacitors and ceramic capacitors, and has excellent ESR because the conductive polymers has high conductivity. Therefore, for example, solid electrolytic capacitors are increasingly employed for high-frequency smoothing application, etc. Also, in recent years, digital devices are operated in high frequency range over several ten kHz, and it is demanded for the solid electrolytic capacitor to have low ESR also in the high frequency range.

The present disclosure has been proposed to address the above problems, and an objective is to provide an electrolytic capacitor with low ESR even in the high frequency range, and the manufacturing method thereof.

Solution to Problems

To address the above problems, a solid electrolytic capacitor of the present embodiment includes: anode foil formed of valve action metal and on which dielectric oxide film is formed on a surface thereof; a cathode body facing the anode foil; and an electrolyte layer including electrolytic solution and a conductive polymer intervening between the anode foil and the cathode foil, in which the cathode body includes cathode foil formed of valve action metal and a conductive layer formed on a surface of the cathode foil, and the electrolytic solution includes a phosphoric acid compound having an alkyl group with a carbon number of 1 to 10.

The phosphoric acid compound may be one type or a mixture of two or more selected from a group of dibutyl phosphate, tributyl phosphate, dibutyl phosphite, and tributyl phosphite.

The conductive layer may include carbon material, titanium, titanium nitride, titanium carbide, and composite material or mixture material thereof.

The phosphoric acid compound may be contained in an amount of 4 mmol or more per 100 g of the electrolytic solution.

The phosphoric acid compound may be contained in an amount of 4 mmol to 16 mmol per 100 g of the electrolytic solution.

The electrolytic solution may include one or more selected from a group of ethylene glycol, glycerin, and sulfolane.

The cathode foil may have an enlarged surface layer on the surface thereof, and the conductive layer may be formed in a shape of the enlarged surface layer.

Furthermore, to address the above problems, a manufacturing method of a solid electrolytic capacitor of the present embodiment is a manufacturing method of a solid electrolytic capacitor including anode foil, a cathode body, and an electrolyte layer, and includes a process of producing the cathode body by forming a conductive layer on a surface of cathode foil formed of valve action metal, a process of preparing electrolytic solution including a phosphoric acid compound having an alkyl group with a carbon number of 1 to 10, and a process of forming an electrolyte layer by intervening the electrolytic solution and a conductive polymer between the anode foil and the cathode body.

Effect of Invention

According to the present disclosure, the solid electrolytic capacitor has low ESR at least in the high frequency range.

EMBODIMENTS

Figure 1:
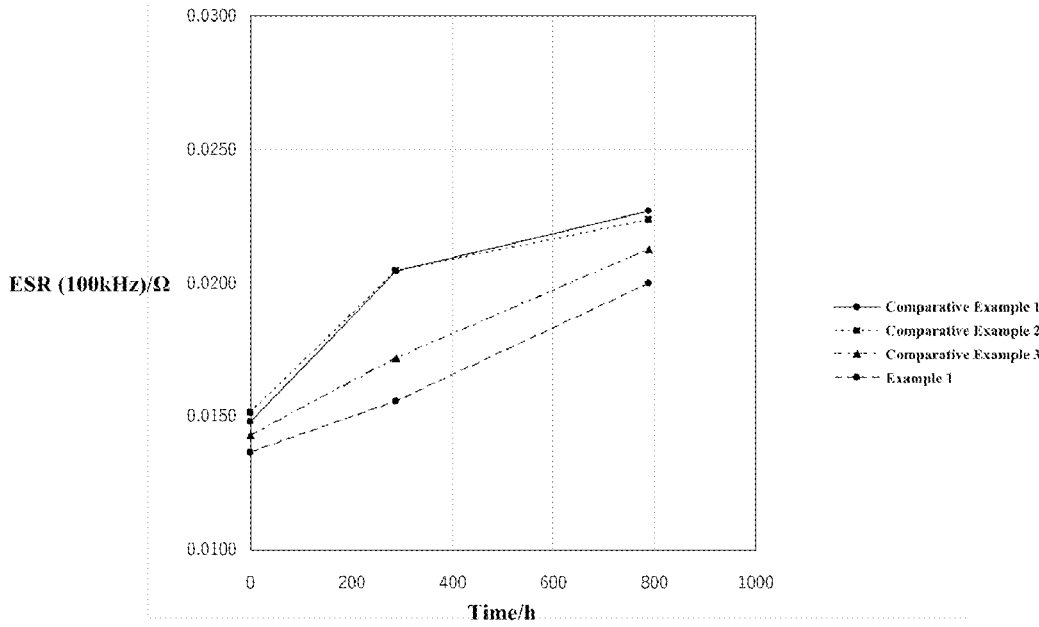
FIG. 1 is a graph indicating the ESR over time in the example 1 and the comparative examples 1, 2, and 3.

Hereinafter, the solid electrolytic capacitor according to embodiments of the present disclosure will be described. Note that the present disclosure is not limited to the following embodiments.

(Solid Electrolytic Capacitor)

A solid electrolytic capacitor is a passive element that gains the capacitance and stores and discharges electric charge by the dielectric polarization of dielectric oxide film. This solid electrolytic capacitor is formed by housing a capacitor element in a casing and sealing an opening of the casing by a sealing body. The capacitor element includes anode foil, cathode foil, a separator, and an electrolyte layer. The anode foil and the cathode body face each other via the separator, and are wound or laminated. Dielectric oxide film is formed on a surface of the anode foil. The electrolyte layer is formed by a solid electrolyte layer including conductive polymers, and electrolytic solution. The solid electrolyte layer is interposed between the anode foil and the cathode foil, and is in close contact with the dielectric oxide film. The electrolytic solution is impregnated in voids of the capacitor element on which the solid electrolyte layer is formed.

(Anode Foil)

The anode foil is a long foil body formed of elongated valve action metal. The valve action metal is aluminum, tantalum, niobium, niobium oxide, titanium, hafnium, zirconium, zinc, tungsten, bismuth, and antimony, etc. The purity of the anode foil is desirably 99.9% or more, and impurities such as silicon, iron, copper, magnesium, and zinc may be included.

The surface of the anode foil is enlarged as a molding formed by molding powder of valve action metal, a sintered body obtained by sintering powder of valve action metal, or etching foil obtained by etching a stretched foil. The enlarged surface structure is formed by tunnel-shaped etching pits, spongy pits, or voids between dense powder. Typically, the enlarged surface structure is formed by direct current etching or alternating current etching in which direct current or alternating current is applied in acidic aqueous solution containing halogen ions such as hydrochloric acid, or is formed by depositing or sintering metal particles, and the like on a core. Note that the etching pit may be formed so as to penetrate the anode foil.

Typically, the dielectric oxide film is oxide film formed on a surface layer of the anode foil. For example, when the anode foil is aluminum foil, the dielectric oxide film is aluminum oxide obtained by oxidizing the enlarged surface structure. The dielectric oxide film is formed by chemical conversion treatment in which voltage is applied in aqueous solution of adipic acid, boric acid, or phosphoric acid, etc.

(Cathode Body)

The cathode body includes cathode foil which is a foil body formed by elongating valve action metal. The purity of the cathode foil is desirably 99% or more, and impurities such as silicon, iron, copper, magnesium, and zinc may be included. The cathode foil is plane foil with a flat surface or an enlarged surface layer is formed on a surface of the cathode foil by surface enlargement. The oxide film may be formed on the enlarged surface layer naturally or intentionally. Intentionally, thin dielectric oxide film (about 1 to 10 V) may be formed by chemical conversion treatment. The natural oxide film is formed when oxygen in the air reacts with the cathode foil.

This cathode body further includes a conductive layer and has a laminate structure of the cathode foil and the conductive layer. The conductive layer contains conductive material and is a layer that is more conductive than the oxide film. This conductive layer is laminated on one surface or both surface of the cathode foil and is located at the outermost surface of the cathode body. For example, the conductive material may be titanium, zirconium, tantalum, niobium, and nitrides or carbides thereof, aluminum carbide, carbon material, and composite material or mixture thereof. A plurality of this conductive layers may be laminated, or each layer may be of different types of layers.

The carbon material is fibrous carbon, carbon powder, or a mixture thereof. The fibrous carbon and carbon powder may be treated with porous treatment, such as opening treatment to form pores or activation treatment. For example, the carbon powder may be natural plant tissue such as coconut shell, synthetic resin such as phenol, activated carbon made from fossil fuel such as coal, coke, pitch, and the like, carbon black such as Ketjen black, acetylene black, and channel black, carbon nanohorn, amorphous carbon, natural graphite, artificial graphite, graphitized Ketjen black, mesoporous carbon, etc. For example, the fibrous carbon is carbon nanotube or carbon nanofiber, etc. The carbon nanotube may be single-walled carbon nanotube with a single layer of a graphene sheet, or multi-walled carbon nanotube (MWCNT) in which two or more layers of graphene sheets are curled up on a same axis and a tube wall forms multiple layers.

The conductive material is attached to the cathode foil by application, vapor-deposition, or thermal treatment, etc. For example, the application method is suitable for forming the conductive layer of carbon material, and slurry including the conductive material, a binder, and a solvent is applied and dried on the cathode body by slurry casting, doctor blading, or spraying, and the like, and the cathode foil and the conductive layer are adhered by pressing if necessary. For example, the vapor deposition method is suitable for forming the metallic conductive layer, and may be vacuum arc vapor-deposition, sputtering vapor-deposition, or electron beam vapor-deposition. In the thermal treatment, powder of the conductive material is attached to the surface of the cathode foil and is sintered.

In the vacuum arc vapor-deposition, voltage is applied to source material in a vacuum chamber to melt and evaporate the source material, and the evaporated material is reacted with reaction gas, to form film of the source material reacted with the reaction gas on the cathode foil. In the sputtering vapor-deposition, a target is placed, plasma is produced under an environment in which reaction gas is filled, and the source material is beaten out from the target and is reacted with the reaction gas, to form film of the source material reacted with the reaction gas on the cathode foil. In electron beam vapor-deposition, electron beam is irradiated to source material in a vacuum chamber to melt and evaporate the source material, and the evaporated material is reacted with reaction gas, to form film of the source material reacted with the reaction gas on the cathode foil.

After laminating the carbon layer and the cathode foil, it is preferable to pressure-weld the carbon layer and the cathode foil by press processing. For example, in the press processing, the cathode body formed by the conductive layer and the cathode foil is sandwiched by a press roller, and press linear pressure is applied. The press pressure is desirably about 0.01 to 100 t/cm. By the press processing, a pressure-welded structure in which the conductive material is pressed into pores of the enlarged surface layer is produced, and a pressure-welded structure in which the conductive material is deformed along an uneven surface of the enlarged surface layer is produced. The pressure-welded structure improves the adhesion and fixability of the conductive layer and the cathode foil, and the ESR of the solid electrolytic capacitor is reduced.

(Solid Electrolyte Layer)

The conductive polymer of the solid electrolyte layer is a self-doped conjugated polymer doped by dopant molecules in the molecules or a doped conjugated polymer doped by external dopant molecules. The conjugated polymer is obtained by chemical oxidative polymerization or electrolytic oxidative polymerization of monomers with a r-conjugated double bond or derivatives thereof. The conductive polymer exhibits high conductivity by the doping to the conjugated polymer. That is, the conductivity is exhibited by adding a small amount of an acceptor that easily accepts electrons or a dopant that is a donor that easily donates electrons to the conjugated polymer.

Known polymers may be used for the conjugated polymer without limitation. For example, the conjugated polymer may be polypyrrole, polythiophene, polyfuran, polyaniline, polyacetylene, polyphenylene, polyphenylenevinylene, polyacene, and polythiophenevinylene, etc. These conjugated polymers may be used in single or in combination of two or more, and may further be a copolymer of two or more kinds of monomers.

Among the above-described conjugated polymers, conjugated polymers formed by polymerizing thiophene or derivatives thereof is preferable, and conjugated polymers in which 3,4-ethylenedioxythiophene (that is, 2,3-dihydrothieno[3,4-b][1,4]dioxin), 3-alkylthiophene, 3-alkoxythiophene, 3-alkyl-4-alkoxythiophene, 3,4-alkylthiophene, 3,4-alkoxythiophene, or derivatives thereof are polymerized are preferable. The thiophene derivatives may preferably be a compound selected from thiophene with substituents at the 3-position and 4-position, and the 3-position and 4-position substituents of the thiophene ring may form a ring together with the 3-position and 4-position carbon. It is preferable that the carbon number of an alkyl group and an alkoxy group is 1 to 16.

In particular, the preferable conjugated polymer is a polymer of 3,4-ethylenedioxythiophene which is called EDOT, that is, poly(3,4-ethylenedioxythiophene) which is called PEDOT. Furthermore, an alkylated ethylenedioxythiophene in which an alkyl group is added to 3,4-ethylenedioxythiophene may be used, and for example, a methylated ethylenedioxythiophene (that is, 2-methyl-2,3-dihydrothieno[3,4-b][1, 4]dioxin), ethylated ethylenedioxythiophene (that is, 2-ethyl-2,3-dihydro-thieno[3,4-b][1,4]dioxine), and the like may be used.

As the dopant, known dopants may be used without limitation. The dopant may be used in single or in combination of two or more. Furthermore, the dopant may also be polymers or monomers. For example, the dopant may be inorganic acid such as polyanion, boric acid, nitric acid, and phosphoric acid, and organic acid such as acetic acid, oxalic acid, citric acid, tartaric acid, squaric acid, logisonic acid, croconic acid, salicylic acid, p-toluenesulfonic acid, 1,2-dihydroxy-3,5-benzenedisulfonic acid, methanesulfonic acid, trifluoromethanesulfonic acid, borodisalicylic acid, bisoxalate borate acid, sulfonylimide acid, dodecylbenzenesulfonic acid, propylnaphthalenesulfonic acid, and butylnaphthalenesulfonic acid.

For example, the polyanion may be polymers consisting of only component units with anion groups or polymers consisting of component units with anion groups and component units without anion groups, and may be substituted or unsubstituted polyalkylene, substituted or unsubstituted polyalkenylene, substituted or unsubstituted polyimide, substituted or unsubstituted polyamide, substituted or unsubstituted polyester. In particular, the polyanion may be polyvinyl sulfonic acid, polystyrene sulfonic acid, polyaryl sulfonic acid, polyacrylic sulfonic acid, polymethacrylic sulfonic acid, poly(2-acrylamide-2-methylpropane sulfonic acid), polyisoprene sulfonic acid, polyacrylic acid, polymethacrylic acid, polymaleic acid, etc.

The solid electrolyte layer may include various additives such as polyhydric alcohol, in addition to the conductive polymer. The polyhydric alcohol may be sorbitol, ethylene glycol, diethylene glycol, triethylene glycol, polyoxyethylene glycol, glycerin, polyglycerin, polyoxyethylene glycerin, xylitol, erythritol, mannitol, dipentaerythritol, pentaerythritol, or combination of two or more. Since the boiling point of the polyhydric alcohol is high, the polyhydric alcohol remains in the solid electrolyte layer even after the drying process, so that ESR reduction and withstand voltage improvement can be achieved.

(Electrolytic Solution)

The electrolytic solution is solution formed by adding anion components and cation components to the solvent Typically, the anion components and the cation components are organic acid salt, inorganic acid salt, or salt of composite compound of organic acid and inorganic acid, and are added to the solvent by ion dissociable salt which dissociates to the anion component and the cation component. Acid that is the anion component and base that is the cation component may be separately added to the solvent. Furthermore, the electrolytic solution may not include the anion component, the cation component, or both.

The electrolytic solution includes phosphoric acid compound with alkyl groups. It is preferable that the carbon number of alkyl groups is 1 to 10. When the straight chain of the alkyl groups becomes longer, the solvent of the electrolytic solution becomes less soluble, but becomes more difficult to hydrolyze, improving the chemical stability. In this range, the excellent balance between the solubility of the phosphoric acid compound with alkyl groups to the solvent of the electrolytic solution and the chemical stability of the phosphoric acid compound with alkyl groups is achieved, and when butyl group is the alkyl group, the balance between the solubility to the solvent of the electrolytic solution and the chemical stability becomes particularly excellent. The phosphoric acid compound should have at least one or more of the alkyl groups.

The phosphoric acid compound may be dibutyl phosphate, tributyl phosphate, dibutyl phosphite, tributyl phosphite, triethyl phosphite, trimethyl phosphite, triisopropyl phosphate, and diisopropyl phosphite.

One or two or more of said phosphoric acid compounds may be included in the electrolytic solution. When the cathode body includes the conductive layer and the electrolytic solution includes such phosphoric acid compounds, the solid electrolytic capacitor exhibits excellent ESR in the high frequency range of 100 kHz, for example, even under the high-temperature environment of 160° C. Furthermore, When the cathode body includes the conductive layer and the electrolytic solution includes such phosphoric acid compounds, excellent leakage current (LC) is maintained even when exposed under the high-temperature environment for a long time.

Preferably, the phosphoric acid compound is 4 mmol or more per 100 g of the electrolytic solution, and more preferably, the phosphoric acid compound id 4 mmol to 16 mmol per 100 g of the electrolytic solution. When the phosphoric acid compound is 4 mmol or more, the solid electrolytic capacitor exhibits excellent ESR in the high frequency range of 100 kHz even when exposed under the high-temperature environment. Furthermore, when the phosphoric acid compound is 16 mmol or more per 100 g of the electrolytic solution, the change in the ESR in the high-temperature environment and in the high frequency range of 100 kHz becomes poor. Therefore, it is further preferable that the phosphoric acid compound is 16 mmol or less per 100 g of the electrolytic solution from the viewpoint of other characteristic and cost of the capacitor.

The anion components of the electrolytic solution may be organic acid, inorganic acid, or composite compounds of organic acid and inorganic acid if the phosphoric acid compound is included. The organic acid may be carboxylic acid such as oxalic acid, succinic acid, glutaric acid, pimelic acid, suberic acid, sebacic acid, phthalic acid, isophthalic acid, terephthalic acid, maleic acid, adipic acid, benzoic acid, toluyl acid, enanthic acids, malonic acids, 1,6-decandicarboxylic acid, 1,7-octanedicarboxylic acid, azelaic acid, undecanedioic acid, dodecanedioic acid, tridecanedioic acid, t-butyladipic acid, 11-vinyl-8-octadecenedioic acid, resolcinic acid, fluorochloric acid, gallic acid, gentisic acid, protocatechuic acid, pyrocatechuic acid, trimellitic acid, and pyromellitic acid, phenols, and sulfonic acid, etc. The inorganic acid may be boric acid, phosphoric acid, phosphorus acid, hypophosphorous acid, carbonic acid, and silicic acid, etc. The composite compound of organic acid and inorganic acid may be borodisalicylic acid, borodioxalic acid, borodiglycolic acid, borodimalonic acid, borodichuccinic acid, borodiadipic acid, borodiazelaic acid, borodibenzoic acid, borodimarainic acid, borodilactic acid, borodiapple acid, borodi tartric acid, borodicitrate acid, borodiphthalic acid, borodi(2-hydroxy) isobutyric acid, borodiresorcinic acid, borodimethylsalicylic acid, borodinaftoeic acid, borodimandelic acid, and borodi (3-hydroxy) propionic acid, etc.

Furthermore, at least one salt of the organic acid, the inorganic acid, and the composite compound of organic acid and inorganic acid may be ammonium salt, quaternary ammonium salt, quaternary amidinium salt, amine salt, sodium salt, and potassium salt, etc. Quaternary ammonium ions of the quaternary ammonium salt may be tetramethylammonium, triethylmethylammonium, and tetraethylammonium, etc. The quaternary amidinium salt may be ethyldimethylimidazolinium and tetramethylimidazolinium, etc. The amine salt may be primary amines, secondary amines, and tertiary amines. The primary amine may be methylamine, ethylamine, propylamine, and the like, the secondary amines may be dimethylamine, diethylamine, ethylmethylamine and dibutylamine, and the like, and the tertiary amines may be trimethylamine, triethylamine, tributylamine, ethyldimethylamine, ethyldiisopropylamine, and the like.

The solvent of the electrolytic solution is not particularly limited, and a protic organic polar solvent or an aprotic organic polar solvent may be used. The protic organic polar solvent may be monohydric alcohol, polyhydric alcohol, and oxyalcohol compound, etc. The monohydric alcohol may be ethanol, propanol, butanol, pentanol, hexanol, cyclobutanol, cyclopentanol, cyclohexanol, and benzyl alcohol, etc. The polyhydric alcohol and the oxyalcohol compound may be ethylene glycol, diethylene glycol, propylene glycol, glycerin, methyl cellosolve, ethyl cellosolve, methoxypropylene glycol, dimethoxypropanol, polyglycerin, and alkylene oxide adduct of polyhydric alcohol such as polyethylene glycol and polyoxyethylene glycerin, etc.

The aprotic organic polar solvents may be sulfones, amides, lactones, cyclic amides, nitriles, and sulfoxides, etc. The sulfone may be dimethyl sulfone, ethylmethyl sulfone, diethyl sulfone, sulfolane, 3-methyl sulfolane, 2,4-dimethyl sulfolane, etc. The amide may be N-methylformamide, N,N-dimethylformamide, N-ethylformamide, N,N-diethylformamide, N-methylacetamide, N,N-dimethylacetamide, N-ethylacetamide, N,N-diethylacetamide and hexamethylphosphoricamide, etc. The lactone and the cyclic amide may be γ-butyrolactone, γ-valerolactone, δ-valerolactone, N-methyl-2-pyrrolidone, ethylene carbonate, propylene carbonate, butylene carbonate, and isobutylene carbonate, etc. The nitrile may be acetonitrile, 3-methoxypropionitrile, and glutaronitrile, etc. The sulfoxide may be dimethyl sulfoxide, etc.

Preferably, ethlene glycol, glycerin, or sulfolane is contained as the solvent of the electrolytic solution or other species in the solvent. Ethylene glycol, glycerin, and sulfolane cause change in the high-order structure of the conductive polymer. Therefore, the excellent initial ESR of the solid electrolytic capacitor is achieved, and the degredation of the ESR in the high-temperature environment is suppressed.

Furthermore, other additives may be added to the electrolytic solution. The additives may be complex compounds of boric acid and polysaccharides (mannit, sorbit, etc.), complex compounds of boric acid and polyhydric alcohol, borate esters, amd nitro compounds (o-nitrobenzoic acid, m-nitrobenzoic acid, p-nitrobenzoic acid, o-nitrophenol, m-nitrophenol, p-nitrophenol, and p-nitrobenzylalcohol etc.), etc. These may be used in single or in combination of two or more.

(Separator)

The separator includes cellulose such as kraft, Manila hemp, esparto, hemp, rayon, and mixed papers thereof, polyester resin such as polyethylene terephthalate, polybutylene terephthalate, polyethylene naphthalates, and derivatives thereof, polytetrafluoroethylene resin, polyvinylidene fluoride resin, vinylon resin, polyamide resin such as aliphatic polyamide, semi-aromatic polyamide, and total aromatic polyamide, polyimide resin, polyethylene resin, polypropylene resin, trimethylpentene resin, polyphenylene sulfide resin, acrylic resin, polyvinyl alcohol resin and the like, and these resin may be used in single or in combination.

Hereinafter, the solid electrolytic capacitors of the examples will be described in more detail. Note that the present disclosure is not limited to the following examples.

EXAMPLES 1 AND 2

The solid electrolytic capacitors of the examples 1 and 2 and the comparative example 1 to 4 were produced. Firstly, the anode foil and the cathode foil were produced using aluminum foil. The surface of the anode foil was enlarged by an etching process, and the dielectric oxide film is formed by the chemical conversion treatment using adipic acid aqueous solution and formation voltage of 61.7 Vfs. The surface of the cathode foil was enlarged by an etching process, and the oxide film is formed by the chemical conversion treatment using adipic acid aqueous solution and formation voltage of 3 Vfs. The conductive layer was laminated on the cathode foil of the examples 1 and 2 and the comparative example 2. The conductive layer was a titanium carbide layer with the thickness of 100 nm and was formed on the surface of the cathode foil by the vacuum vapor-deposition. The conductive layer was not formed on the comparative examples 1, 3, and 4.

Lead wire was connected to each of the anode foil and the cathode foil or cathode body, and the anode foil and the cathode foil or cathode body were wound to face each other via a cellulose-based separator. The wound body were immersed in aqueous solution of ammonium dihydrogen phosphate for 20 minutes to perform restorative conversion. Then, the wound body was dried at 105° C.

The wound body was immersed in dispersion of the conductive polymer to attach the conductive polymer on the dielectric oxide film of the anode foil, the cathode foil, and the separator. Particles of poly(3,4-dioxythiophene) doped with polystyrene sulfonic acid was dispersed as the conductive polymer in the dispersion of the conductive polymer, and ethylene glycol was added. After the wound body was immersed in the dispersion of the conductive polymer for the first time, the wound body was dried for 30 minutes at 125° C. Furthermore, After the wound body was immersed in the dispersion of the conductive polymer for the second time, the wound body was dried for 30 minutes at 150° C.

Furthermore, the wound body on which the conductive polymer attached to was impregnated with the electrolytic solution. The electrolytic solution of each of the examples and the comparative example contained ethylene glycol as the solvent. Only azelaic acid of 16 mmol per 100 g of the electrolytic solution was contained in the electrolytic solution of the comparative examples 1 and 2, azelaic acid and dibutyl phosphate of 16 mmol each per 100 g of the electrolytic solution were contained in electrolytic solution of the example 1 and the comparative example 3, and azelaic acid and tributyl phosphate of 16 mmol each per 100 g of the electrolytic solution were contained in electrolytic solution of the example 2 and the comparative example 4. Furthermore, ammonia of 16 mmol was included as the cation component of the solute in the electrolytic solution of each of the examples and the comparative example.

The capacitor element impregnated with the electrolytic solution was inserted into a cylindrical outer casing with a bottom. A sealing rubber was mounted to an opened end of the outer casing, and the outer casing was sealed by a crimping process. Each of the solid electrolytic capacitors was aged by voltage application. The produced solid electrolytic capacitors had a diameter of 10.0 mm, a height of 10.0 mm, and rated withstand voltage of 35 WV, and the rated capacity was 330 μF in the comparative example 1, 3, and 4, and the rated capacity in the examples 1 and 2 and the comparative example 2 was 390 μF.

(High Frequency ESR 1)

Figure 2:
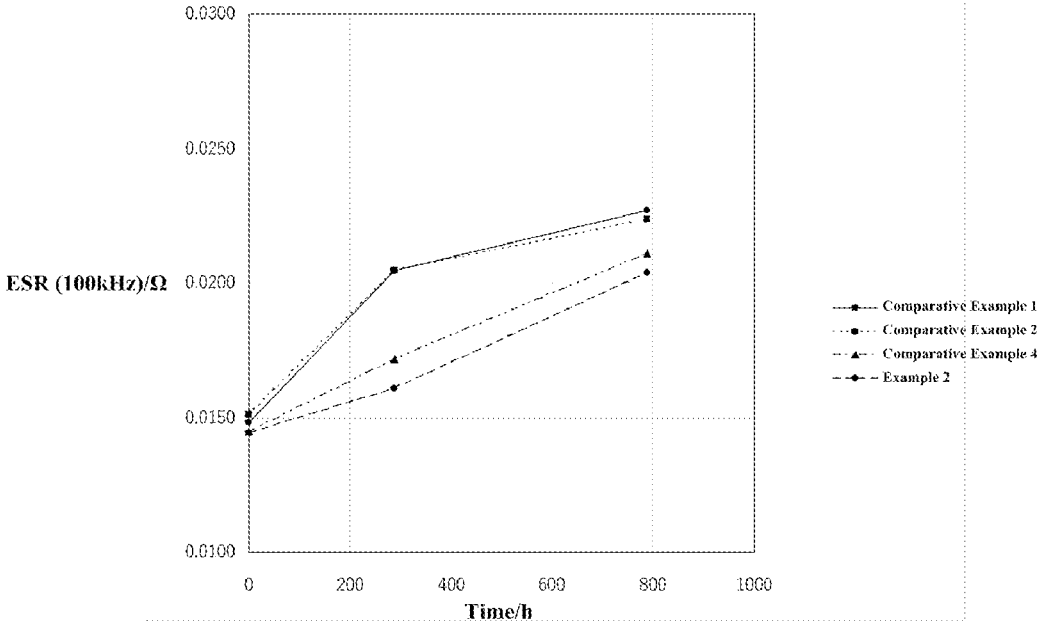
FIG. 2 is a graph indicating the ESR over time in the example 2 and the comparative examples 1, 2, and 4.

The ESR of the solid electrolytic capacitors of the examples 1 and 2 and the comparative example examples 1 to 4 was measured. The solid electrolytic capacitors were exposed under the temperature environment of 160° C., and the EST over time was measured. The measured frequency was 100 kHz that is the high frequency range. The ESR right before the solid electrolytic capacitor was exposed under the temperature environment of 160° C., that is, the ESR where the elapsed time is zero, and the ESR after 800 hours had elapsed is shown in the table 1. Furthermore, the ESR of the example 1 and the comparative examples 1 to 3 are shown in the graph of FIG. 1, and the ESR of the example 2 and the comparative examples 1, 2, and 4 are shown in the graph of FIG. 2. In the graphs of FIGS. 1 and 2, the horizontal axis indicates the elapsed time and the vertical axis indicates the ESR.

TABLE 1

| | | | Composition of Solute in Electrolytic Solution | | | ESR | |
| | Type of Conductive layer | Type of Phosphoric Acid Compound | Ammonia/ mmol | Azelaic Acid/mmol | Phosphoric Acid Compound/mmol | (100 kHz)/Ω | |
| | | | | | | 0 h | 800 h |
| Comparative Example 1 | None | None | 16 | 16 | — | 0.0148 | 0.0227 |
| Comparative Example 2 | Titanium Carbide | None | 16 | 16 | — | 0.0151 | 0.0224 |
| Comparative Example 3 | None | Dibutyl Phosphate | 16 | 16 | 16 | 0.0143 | 0.0212 |
| Comparative Example 4 | None | Tributyl Phosphate | 16 | 16 | 16 | 0.0145 | 0.0211 |
| Example 1 | Titanium Carbide | Dibutyl Phosphate | 16 | 16 | 16 | 0.0136 | 0.0200 |
| Example 2 | Titanium Carbide | Tributyl Phosphate | 16 | 16 | 16 | 0.0144 | 0.0204 |

As shown in the table 1 and FIGS. 1 and 2, the comparative examples 3 and 4 in which dibutyl phosphate or tributyl phosphate was added to the electrolytic solution achieved low ESR than the comparative example 1 in the elapsed time of both zero and 800 hours. The difference between the comparative examples 3 and 1 was 0.0015Ω after 800 hours had elapsed, and the difference between the comparative examples 4 and 1 was 0.0016Ω after 800 hours had elapsed. The ESR of the comparative example 2 with the conductive layer on the cathode foil almost did not change from the comparative example 1 in both zero and 800 hours.

In contrast, in the examples 1 and 2 in which dibutyl phosphoric acid or tributyl phosphoric acid was added to the electrolytic solution and the conductive layer is formed on the cathode foil, the ESR after 800 hours had elapsed was 0.012 0 and 0.0007Ω lower than those of the comparative examples 3 and 4. Although the ESR of the comparative example 2 with the conductive layer on the cathode foil almost did not change from the comparative example 1 in both zero and 800 hours, excellent ESR was achieved in the examples 1 and 2.

(High-Frequency ESE and LC)

The ESR of the solid electrolytic capacitors of the examples 1, 3 to 7 and the comparative example 5 was measured. The solid electrolytic capacitors were exposed under the temperature environment of 150° C., and the ESR over time was measured. The measured frequency was 100 kHz that is the high frequency range. The ESR right before the solid electrolytic capacitor was exposed under the temperature environment of 150° C., that is, the ESR where the elapsed time is zero, and the ESR after 260 hours had elapsed is shown in the table 2.

Furthermore, the LC (Leakage Current) of the solid electrolytic capacitors of the examples 1 and the comparative example 5 was measured. After the solid electrolytic capacitors had been left in the temperature environment of 150° C. for 2700 hours, the leakage current was measured. The leakage current was a current value of when the rated withstand voltage of 35 WV was applied to the solid electrolytic capacitors and said voltage was maintained for 2 minutes. The results of the leakage current are shown in the table 2.

TABLE 2

| | Type of Conductive layer | Type of Phosphoric Acid Compound | Composition of Electrolytic Solution | | | ESR | | |
|---|---|---|---|---|---|---|---|---|
| | | | Ammonia/ mmol | Azelaic Acid/mmol | Phosphoric Acid Compound/mmol | (100 kHz)/Ω 0 h | 260 h | LC (μA) 2700 h |
| Example 1 | TiC | Dibutyl Phosphate | 16 | 16 | 16 | 0.0137 | 0.0161 | 21.5 |
| Example 3 | TiC | Dibutyl Phosphate Triisopropyl Phosphate | 16 | 16 | 8 8 | 0.0133 | 0.0160 | — |
| Example 4 | TiC | Dibutyl Phosphite | 16 | 16 | 16 | 0.0137 | 0.0163 | — |
| Example 5 | TiC | Triethyl Phosphite | 16 | 16 | 16 | 0.0133 | 0.0165 | — |
| Example 6 | TiC | Trimethyl Phosphite | 16 | 16 | 16 | 0.0137 | 0.0168 | — |
| Example 7 | TiC | Triisopropyl Phosphate | 16 | 16 | 16 | 0.0137 | 0.0165 | — |
| Comparative Example 7 | TiC | Phosphoric Acid | 16 | 16 | 16 | 0.0133 | 0.0169 | 135.02 |

By this, it was observed that, when the cathode body included the conductive layer formed on the surface of the cathode foil and the electrolytic solution contained the phosphoric acid compound having alkyl groups with the carbon number of 1 to 10, the ESR of the solid electrolytic capacitor is reduced. In particular, when the electrolytic solution contained the phosphoric acid compound with a butyl group, the ESR of the solid electrolytic capacitor was reduced more.

EXAMPLES 3 TO 7

Next, the solid electrolytic capacitors of the examples 3 to 7 were produced. The solid electrolytic capacitors of the examples 3 to 7 included titanium carbide in the cathode body as the conductive layer, like the examples 1 and 2, but included phosphoric acid compound of different type from the examples 1 and 2. However, the phosphoric acid compound of the examples 3 to 7 had alkyl groups with the carbon number of 1 to 10. Furthermore, the solid electrolytic capacitor of the comparative example 5 included titanium carbide in the cathode body and included phosphoric acid in the electrolytic solution. The solid electrolytic capacitors of the examples 3 to 7 and the comparative example 5 were produced by the same method and the same condition and had the same structure, the same composition, and the same composition ratio as the example 1, except for the type of the phosphoric acid compound.

As shown in the table 2, the phosphoric acid compound of the example 1 was dibutyl phosphate. In the example 3, dibutyl phosphate and triisopropyl phosphate of equimolar amount was mixed in the electrolytic solution. The phosphoric acid compound of the example 4 was dibutyl phosphite. The phosphoric acid compound of the example 5 was triethyl phosphite. The phosphoric acid compound of the example 6 was trimethyl phosphite. The phosphoric acid compound of the example 7 was triisopropyl phosphate.

As shown in the table 2, the solid electrolytic capacitors of the examples 3 an 4 were the solid electrolytic capacitor containing the phosphoric acid compound with a butyl group in the electrolytic solution, like the examples 1 and 2, As shown in the table 2, in the examples 3 and 4, the ESR where the elapsed time is zero and the ESR after 260 hours had elapsed did not change from the example 1 in the table 2.

Furthermore, the solid electrolytic capacitors of the examples 4 and 7 were the solid electrolytic capacitor containing the phosphoric acid compound with alkyl groups other than butyl group in the electrolytic solution. The solid electrolytic capacitor of the examples 4 to 7 had excellent ESR characteristic like the solid electrolytic capacitors of the examples 1, 3, and 4. In this way, it was observed that, when the cathode body included the conductive layer formed on the surface of the cathode foil and the electrolytic solution contained the phosphoric acid compound having alkyl groups with the carbon number of 1 to 10, the ESR of the solid electrolytic capacitor was reduced. Furthermore, since the solid electrolytic capacitors of the examples 1, 3, and 4 containing the phosphoric acid compound with butyl group had particularly excellent ESR characteristic, the alkyl group was preferably butyl group.

Note that if the phosphoric acid is added to the electrolytic solution instead of the phosphoric acid compound having alkyl groups with the carbon number of 1 to 10, the leakage current (LC) becomes worse than the example 1. By using the phosphoric acid compound having alkyl groups with the carbon number of 1 to 10, the degradation of the LC like in the comparative example 5 can be prevented.

EXAMPLES 8 TO 10

Next, the solid electrolytic capacitors of the examples 8 to 10 were produced. The solid electrolytic capacitor of the examples 8 to 10 included phosphoric acid compounds of different type from the examples 1 and 2 as the phosphoric acid compound and included a conductive layer different from the examples 1 and 2. Furthermore, the solid electrolytic capacitors of the comparative examples 6 to 8 in which the type of the conductive layer was same and the phosphoric acid compound was not contained in the electrolytic solution was produced corresponding to the examples 8 to 10.

The solid electrolytic capacitor of the example 8 and the solid electrolytic capacitor of the comparative examples 6 corresponding to the example 8 were produced as follows. That is, in the example 8, the conductive layer laminated on the cathode foil was a carbon nanotube layer with the thickness of 100 nm was formed on the surface of the cathode foil by the vacuum vapor-deposition. The conductive layer was not laminated on the cathode foil of comparative example 6. The cellulose-based separator was intervened between the anode foil and the cathode or the cathode foil. The produced solid electrolytic capacitors had a diameter of 10.0 mm, a height of 7.7 mm, the rated withstand voltage of 25 WV, and the rated capacity of 270 µF. Other production method, production condition, capacitor structure, composition, and composition ratio of the example 8 and the comparative example 6 were the same as the example 1.

The solid electrolytic capacitor of the example 9 and the solid electrolytic capacitor of the comparative examples 7 sandwiched by a press roller, and press linear pressure was applied. The conductive layer was not laminated on the cathode foil of the comparative example 7. The cellulose-based separator was intervened between the anode foil and the cathode or the cathode foil. The produced solid electrolytic capacitors had a diameter of 10.0 mm, a height of 10.0 mm, the rated withstand voltage of 25 WV, and the rated capacity of 580 µF. Other production method, production condition, capacitor structure, composition, and composition ratio of the example 9 and the comparative example 7 were the same as the example 1.

The solid electrolytic capacitor of the example 10 and the solid electrolytic capacitor of the comparative examples 8 corresponding to the example 10 were produced as follows. That is, in the example 10, the conductive layer laminated on the cathode foil was a titanium nitride layer with the thickness of 100 nm was formed on the surface of the cathode foil by the vacuum vapor-deposition. The conductive layer was not laminated on the cathode foil of the comparative example 8. The cellulose-based separator was intervened between the anode foil and the cathode or the cathode foil. The produced solid electrolytic capacitors had a diameter of 10.0 mm, a height of 10.0 mm, the rated withstand voltage of 25 WV, and the rated capacity of 470 µF. Other production method, production condition, capacitor structure, composition, and composition ratio of the example 10 and the comparative example 8 were the same as the example 1.

(High Frequency ESR)

The ESR of the solid electrolytic capacitors of the example 1 and the comparative example 2, the example 8 and the comparative example 6, the example 9 and the comparative example 7, and the example 10 and the comparative example 8, respectively corresponding to each other, were measured. The solid electrolytic capacitors were exposed under the temperature environment of 150° C., and the ESR over time was measured. The measured frequency was 100 kHz that is the high frequency range. The ESR right before the solid electrolytic capacitor was exposed under the temperature environment of 150° C., that is, the ESR where the elapsed time is zero, and the ESR after 260 hours had elapsed is shown in the table 3.

TABLE 3

| Type of Conductive layer | Type of Phosphoric Acid Compound | Composition of Electrolytic Solution | | | ESR (100 kHz)/Ω | |
|---|---|---|---|---|---|---|
| | | Ammonia/ mmol | Azelaic Acid/mmol | Phosphoric Acid Compound/mmol | 0 h | 260 h |
| Comparative Example 2 — TiC | None | 16 | 16 | 16 | 0.0140 | 0.0200 |
| Example 1 — TiC | Dibutyl Phosphate | 16 | 16 | 16 | 0.0137 | 0.0161 |
| Comparative Example 6 — CNT | None | 16 | 16 | 16 | 0.0276 | 0.0603 |
| Example 8 — CNT | Dibutyl Phosphate | 16 | 16 | 16 | 0.0199 | 0.0341 |
| Comparative Example 7 — Carbon | None | 16 | 16 | 16 | 0.0166 | 0.0213 |
| Example 9 — Carbon | Dibutyl Phosphate | 16 | 16 | 16 | 0.0162 | 0.0196 |
| Comparative Example 8 — TiN | None | 16 | 16 | 16 | 0.0153 | 0.4773 |
| Example 10 — TiN | Dibutyl Phosphate | 16 | 16 | 16 | 0.0145 | 0.0197 | corresponding to the example 9 were produced as follows. That is, in the example 9, the conductive layer laminated on the cathode foil was a carbon black layer with the thickness of 100 nm and was formed on the surface of the cathode foil by the vacuum vapor-deposition. The cathode body was As shown in the table 3, the ESR when used in the high frequency of the example 8 in which the conductive layer was the carbon nanotube layer was better than that of the comparative example 6, and was more better when exposed in the high-temperature environment. As shown in the table 3, the ESR when used in the high frequency of the example 9 in which the conductive layer was the carbon black layer was better than that of the comparative example 7, and remained better even when exposed in the high-temperature environment. As shown in the table 3, the ESR when used in the high frequency of the example 10 in which the conductive layer was the titanium nitride layer was better than that of the comparative example 8. Moreover, the ESR of the comparative example 6 exposed under the high-temperature environment became significantly worse, whereas the ESR of the example 10 was maintained low even when exposed under the high-temperature environment.

Accordingly, the ESR in the high frequency became excellent by forming the conductive layer including, for example, carbon material, titanium, titanium carbide, and composite material or mixture thereof, regardless of the types of the conductive layer. In particular, the combination of the conductive layer of titanium nitride and the electrolytic solution including the phosphoric acid compound having alkyl groups with the carbon number of 1 to 10 made the ESR of the solid electrolytic capacitor more excellent than the solid electrolytic capacitor which only laminated the conductive layer of titanium nitride on the cathode foil.

EXAMPLES 11 TO 16

Next, the solid electrolytic capacitors of the examples 11 to 16 were produced. The solid electrolytic capacitors of the examples 11 to 16 and the example 1 were produced by the same method and the same condition and had the same structure, the same composition, and the same composition ratio, except that the addition amount of the phosphoric acid compound were different.
(High Frequency ESR)

The ESR of the solid electrolytic capacitors of the examples 1 and 11 to 16 and the comparative example 2 were measured. The solid electrolytic capacitors were exposed under the temperature environment of 150° C., and the ESR over time was measured. The measured frequency was 100 kHz that is the high frequency range. The ESR right before the solid electrolytic capacitor was exposed under the temperature environment of 150° C., that is, the ESR where the elapsed time is zero, and the ESR after 260 hours had elapsed is shown in the table 4.

As shown in the table 4, the phosphoric acid compound was not added in the comparative example 2. In the examples 1 and 11 to 16, the addition amount of dibutyl phosphate per 100 g of the electrolytic solution varied from 2 mmol to 33 mmol.

As shown in the table 4, when the addition amount of the phosphoric acid compound was 4 mmol or more per 100 g of the electrolytic solution, the ESR after 260 hours had elapsed became particularly excellent. Furthermore, when the addition amount of the phosphoric acid compound was 16 mmol and 33 mmol per 100 g of the electrolytic solution, the ESR after 260 hours did not change.

EXAMPLES 17 TO 25

Next, the solid electrolytic capacitors of the examples 17 to 25 were produced. The solid electrolytic capacitors of the examples 17 and the example 1 were produced by the same method and the same condition and had the same structure, the same composition, and the same composition ratio, except for the types of the cation included in the electrolytic capacitor. The solid electrolytic capacitors of the examples 18 to 25 was different from the example 17 in the solvent species of the electrolytic capacitor, and were produced by the same method and the same condition and had the same structure, the same composition, and the same composition ratio as the example 1, except that for the cation species and the solvent species. Furthermore, the comparative example 9 which is the same as the solid electrolytic capacitor of the example 25 except that the phosphoric acid compound was not contained in the electrolytic solution was produced.
(High Frequency ESR)

The ESR of the solid electrolytic capacitors of the examples 1 and 17 to 25 and the comparative example 9 were measured. The solid electrolytic capacitors were exposed under the temperature environment of 150° C., and the ESR over time was measured. The measured frequency was 100 kHz that is the high frequency range. The ESR right before the solid electrolytic capacitor was exposed under the temperature environment of 150° C., that is, the ESR where the elapsed time is zero, and the ESR after 260 hours had elapsed is shown in the table 5.

TABLE 4

| | Type of Conductive layer | Type of Phosphoric Acid Compound | Composition of Electrolytic Solution | | | ESR (100 kHz)/Ω | |
| --- | --- | --- | --- | --- | --- | --- | --- |
| | | | Ammonia/ mmol | Azelaic Acid/mmol | Phosphoric Acid Compound/mmol | 0 h | 260 h |
| Comparative Example 2 | TiC | None | 16 | 16 | 0 | 0.0140 | 0.0200 |
| Example 11 | TIC | Dibutyl Phosphate | 16 | 16 | 2 | 0.0139 | 0.0191 |
| Example 12 | TiC | Dibutyl Phosphate | 16 | 16 | 4 | 0.0138 | 0.0184 |
| Example 13 | TiC | Dibutyl Phosphate | 16 | 16 | 6 | 0.0136 | 0.0174 |
| Example 14 | TiC | Dibutyl Phosphate | 16 | 16 | 8 | 0.0136 | 0.0171 |
| Example 15 | TiC | Dibutyl Phosphate | 16 | 16 | 10 | 0.0136 | 0.0167 |
| Example 1 | TiC | Dibutyl Phosphate | 16 | 16 | 16 | 0.0137 | 0.0161 |
| Example 16 | TiC | Dibutyl Phosphate | 16 | 16 | 33 | 0.0136 | 0.0160 |

TABLE 5

| | Type of Conductive layer | Type of Phosphoric Acid Compound | Composition of Electrolytic Solution | | |
|---|---|---|---|---|---|
| | | | Solvent Species | Cation Species | Cation/mmol |
| Example 1 | TiC | Dibutyl Phosphate | Ethylene Glycol | Ammonia | 16 |
| Example 17 | TiC | Dibutyl Phosphate | Ethylene Glycol | Triethylamine | 16 |
| Example 18 | TiC | Dibutyl Phosphate | Ethylene Glycol (90) Glycerin (10) | Triethylamine | 16 |
| Example 19 | TiC | Dibutyl Phosphate | Ethylene Glycol (40) Glycerin (60) | Triethylamine | 16 |
| Example 20 | TiC | Dibutyl Phosphate | Glycerin | Triethylamine | 16 |
| Example 21 | TiC | Dibutyl Phosphate | Sulfolane | Triethylamine | 16 |
| Example 22 | TiC | Dibutyl Phosphate | Sulfolane (50) Polyethylene Glycol #300 (50) | Triethylamine | 16 |
| Example 23 | TiC | Dibutyl Phosphate | Sulfolane (70) Polyethylene Glycol #300 (30) | Triethylamine | 16 |
| Example 24 | TiC | Dibutyl Phosphate | γ-butyrolactone | Triethylamine | 16 |
| Example 25 | TiC | Dibutyl Phosphate | Glycerin (50) Polyethylene Glycol #300 (50) | Triethylamine | 16 |
| Comparative Example 9 | TiC | None | γ-butyrolactone | Triethylamine | 16 |

| | Composition of Electrolytic Solution | | ESR (100 kHz)/Ω | |
|---|---|---|---|---|
| | Azelaic Acid/mmol | Phosphoric Acid Compound/mmol | 0 h | 260 h |
| Example 1 | 16 | 16 | 0.0137 | 0.0161 |
| Example 17 | 16 | 16 | 0.0137 | 0.0186 |
| Example 18 | 16 | 16 | 0.0136 | 0.0186 |
| Example 19 | 16 | 16 | 0.0140 | 0.0201 |
| Example 20 | 16 | 16 | 0.0145 | 0.0213 |
| Example 21 | 16 | 16 | 0.0155 | 0.0242 |
| Example 22 | 16 | 16 | 0.0160 | 0.0281 |
| Example 23 | 16 | 16 | 0.0151 | 0.0252 |
| Example 24 | 16 | 16 | 0.0145 | 0.0339 |
| Example 25 | 16 | 16 | 0.0155 | 0.266 |
| Comparative Example 9 | 16 | — | 0.0155 | 1.2596 |

As shown in the table 5, the solid electrolytic capacitor of the example 17 was different from the example 1 in that triethylamine was added to the electrolytic solution instead of ammonia, Triethylamine was added as the cation species in the solid electrolytic capacitors of the examples 18 to 25 and the comparative example 9. In the example 18, the solvent species of the electrolytic solution was ethylene glycol and glycerin, and 90 wt % of the solvent was ethylene glycol and 10 wt % of the solvent was glycerin. In the example 19, the solvent species of the electrolytic solution was ethylene glycol and glycerin, and 40 wt % of the solvent was ethylene glycol and 60 wt % of the solvent was glycerin.

In the example 20, the solvent species of the electrolytic solution was glycerin. In the example 21, the solvent species of the electrolytic solution was sulfolane. In the example 22, the solvent species of the electrolytic solution was sulfolane of equimolar amount in the weight ratio and polyethylene glycol with the average molecular weight of 300. In the example 23, the solvent species of the electrolytic solution was glycerin and ethylene glycol with the average molecular weight, and 70 wt % of the solvent was glycerin and 30 wt % of the solvent was polyethylene glycol with the average molecular weight of 300. In the example 24, the solvent species of the electrolytic solution was γ-butyrolactone. In the example 25, the solvent species of the electrolytic solution was glycerin and ethylene glycol with the average molecular weight, and the weight ratio of glycerin and polyethylene glycol with the average molecular weight of 300 was equivalent. In comparative example 9, the electrolytic solution did not contain dibutyl phosphate, and the solvent species of the electrolytic solution was γ-butyrolactone.

As shown in the table 5, the ESR of the example 1 was the same as the example 17 before being exposed under the high-temperature environment and was lower than the example 18 after being exposed under the high-temperature environment. That is, although all types of the cation species did not interfere the reduction of the ESR, ammonia was particularly preferable for the cation species added to the electrolytic solution.

Furthermore, as shown in the table 5, the ESR of the examples 17 to 23 after being exposed under the high-temperature environment was 0.0260Ω or less. The ESR of the example 24 after being exposed under the high-temperature environment was 0.0330Ω or more. Accordingly, although all types of the solvent did not interfere the reduction of the ESR, one type or the mixture of two or more types selected from a group of ethylene glycol, glycerin, and sulfolane was particularly preferable for the solvent added to the electrolytic solution.

The invention claimed is:

1. A solid electrolytic capacitor comprising:

anode foil including valve action metal and on which dielectric oxide film is formed on a surface thereof;

a cathode body facing the anode foil; and an electrolyte layer including electrolytic solution and a conductive polymer and intervening between the anode foil and the cathode body, wherein:

the cathode body includes cathode foil including valve action metal and a conductive layer formed on a surface of the cathode foil, the electrolytic solution includes a phosphoric acid compound having an alkyl group with a carbon number of 1 to 10, and the phosphoric acid compound is contained in an amount of 10 mmol or more per 100 g of the electrolytic solution.

2. The solid electrolyte capacitor according to claim 1, wherein the phosphoric acid compound is one type or a mixture of two or more selected from a group of dibutyl phosphate, tributyl phosphate, dibutyl phosphite, and tributyl phosphite.

3. The solid electrolyte capacitor according to claim 2, wherein the conductive layer includes carbon material, titanium, titanium nitride, titanium carbide or composite material, or mixture material thereof.

4. The solid electrolytic capacitor according to claim 3, wherein the phosphoric acid compound is contained in the amount of 10 mmol to 16 mmol per 100 g of the electrolytic solution.

5. The solid electrolytic capacitor according to claim 4, wherein the electrolytic solution includes one or more selected from a group of ethylene glycol, glycerin, and sulfolane.

6. The solid electrolytic capacitor according to claim 5, wherein:

the cathode foil has an enlarged surface layer on the surface thereof, and the conductive layer is formed in a shape of the enlarged surface layer.

7. The solid electrolytic capacitor according to claim 4, wherein:

the cathode foil has an enlarged surface layer on the surface thereof, and the conductive layer is formed in a shape of the enlarged surface layer.

8. The solid electrolytic capacitor according to claim 3, wherein the electrolytic solution includes one or more selected from a group of ethylene glycol, glycerin, and sulfolane.

9. The solid electrolytic capacitor according to claim 3, wherein:

the cathode foil has an enlarged surface layer on the surface thereof, and the conductive layer is formed in a shape of the enlarged surface layer.

10. The solid electrolytic capacitor according to claim 2, wherein the phosphoric acid compound is contained in the amount of 10 mmol to 16 mmol per 100 g of the electrolytic solution.

11. The solid electrolytic capacitor according to claim 2, wherein the electrolytic solution includes one or more selected from a group of ethylene glycol, glycerin, and sulfolane.

12. The solid electrolytic capacitor according to claim 2, wherein:

the cathode foil has an enlarged surface layer on the surface thereof, and the conductive layer is formed in a shape of the enlarged surface layer.

13. The solid electrolyte capacitor according to claim 1, wherein the conductive layer includes carbon material, titanium, titanium nitride, titanium carbide, or composite material or mixture material thereof.

14. The solid electrolytic capacitor according to claim 1, wherein the phosphoric acid compound is contained in the amount of 10 mmol to 16 mmol per 100 g of the electrolytic solution.

15. The solid electrolytic capacitor according to claim 1, wherein the electrolytic solution includes one or more selected from a group of ethylene glycol, glycerin, and sulfolane.

16. The solid electrolytic capacitor according to claim 1, wherein:

the cathode foil has an enlarged surface layer on the surface thereof, and the conductive layer is formed in a shape of the enlarged surface layer.

17. A manufacturing method of a solid electrolytic capacitor including anode foil, a cathode body, and an electrolyte layer, comprising:

a process of producing the cathode body by forming a conductive layer on a surface of cathode foil including valve action metal, a process of preparing electrolytic solution including a phosphoric acid compound having an alkyl group with a carbon number of 1 to 10, the phosphoric acid compound contained in an amount of 10 mmol or more per 100 g of the electrolytic solution, and a process of forming the electrolyte layer by intervening the electrolytic solution and a conductive polymer between the anode foil and the cathode body.

18. The manufacturing method according to claim 17, wherein the conductive layer includes carbon material, titanium, titanium nitride, titanium carbide, or composite material or mixture material thereof.

* * * * *